United States Patent
Leung et al.

(10) Patent No.: US 11,465,939 B2
(45) Date of Patent: Oct. 11, 2022

(54) MORTAR REPAIRED REINFORCED CONCRETE STRUCTURE

(71) Applicant: Chun Wo Construction & Engineering Co., Ltd., Hong Kong (HK)

(72) Inventors: Kin Ying Christopher Leung, Hong Kong (HK); Honggang Zhu, Hong Kong (HK); Yuet Kee Lam, Hong Kong (HK); Shue Kai Chou, Hong Kong (HK); Kai Yin To, Hong Kong (HK)

(73) Assignee: Chun Wo Construction & Engineering Co., Ltd., Hong Kong (HK)

( * ) Notice: Subject to any disclaimer, the term of this patent is extended or adjusted under 35 U.S.C. 154(b) by 571 days.

(21) Appl. No.: 16/595,499

(22) Filed: Oct. 8, 2019

(65) Prior Publication Data

US 2020/0109087 A1   Apr. 9, 2020

(30) Foreign Application Priority Data

Oct. 9, 2018  (HK) .................................. 18112847.0

(51) Int. Cl.
| | | |
|---|---|---|
| *C04B 28/14* | (2006.01) | |
| *C04B 14/48* | (2006.01) | |
| *C04B 16/06* | (2006.01) | |
| *C04B 24/26* | (2006.01) | |
| *C04B 18/02* | (2006.01) | |
| *C04B 18/14* | (2006.01) | |
| *C04B 14/06* | (2006.01) | |
| *C04B 103/32* | (2006.01) | |
| *C04B 111/72* | (2006.01) | |

(52) U.S. Cl.
CPC .............. *C04B 28/14* (2013.01); *C04B 14/06* (2013.01); *C04B 14/48* (2013.01); *C04B 16/0633* (2013.01); *C04B 18/027* (2013.01); *C04B 18/146* (2013.01); *C04B 24/2623* (2013.01); *C04B 2103/32* (2013.01); *C04B 2111/723* (2013.01); *C04B 2201/50* (2013.01)

(58) Field of Classification Search
CPC .. C04B 7/02; C04B 7/24; C04B 14/06; C04B 14/48; C04B 16/0633; C04B 18/027; C04B 18/146; C04B 20/002; C04B 22/163; C04B 24/26; C04B 24/2623; C04B 24/283; C04B 28/04; C04B 28/14; C04B 2103/32; C04B 2111/00267; C04B 2111/72; C04B 2111/723; C04B 2201/50; E04G 23/0218

See application file for complete search history.

(56) References Cited

FOREIGN PATENT DOCUMENTS

| | | |
|---|---|---|
| CN | 1970491 A | 5/2007 |
| CN | 101665342 A | 3/2010 |
| CN | 103864393 A | 6/2014 |
| CN | 105060784 A | 11/2015 |
| CN | 105645856 A | 6/2016 |
| CN | 106812334 A | 6/2017 |

OTHER PUBLICATIONS

Lihua XU et al. "Study on uniaxial tensile stress-strain relationship of steel-polypropylene hybrid fiber reinforces concrete." China Civil Engineering Journal 47(7), 2014, pp. 35-45.
Office Action of Corresponding China Invention Patent Application No. 201910955727.8 dated Jun. 16, 2021.

*Primary Examiner* — Anthony J Green
(74) *Attorney, Agent, or Firm* — Idea Intellectual Limited; Margaret A. Burke; Sam T. Yip (57) ABSTRACT

A repaired reinforced concrete structure is provided which includes one or more reinforcing steel bars of cross-sectional area $A_x$, the one or more reinforcing steel bars having one or more corroded sections of cross-sectional area $A_y$, wherein $A_y$ is greater than or equal to approximately 0.6 $A_x$. A reinforced ordinary Portland cement-based repair mortar is positioned directly on the one or more corroded sections of the one or more reinforcing steel bars without the addition of a lapped reinforcing steel bar. The reinforced repair mortar includes at least approximately 1 percent by volume of reinforcing steel fibers such that the reinforced repair mortar restores a strength of a repaired region to greater than approximately 100% of an original strength of the concrete structure in an uncorroded state. The repaired reinforced concrete structure is highly durable, as the repair mortar exhibits an air permeability resistance of greater than 1000 seconds.

10 Claims, 8 Drawing Sheets

FIG. 1 (Prior Art)

FIG. 2 Repair Structure (Invention)

0.4mm × 25mm  
Aspect ratio = 62.5

0.75mm × 50mm  
Aspect ratio = 66.7

0.65mm × 60mm  
Aspect ratio = 92.3

FIG. 3 (Fibers)

Finished Surface

MORTAR REPAIRED REINFORCED CONCRETE STRUCTURE

CROSS-REFERENCE TO RELATED APPLICATION

This application claims priority from a Hong Kong patent application number 18112847.0 filed Oct. 9, 2018, and the disclosure of which is incorporated herein by reference in its entirety.

FIELD OF THE INVENTION

The present invention relates to a repaired concrete structure and, more particularly, to a repaired reinforced concrete structure that includes a section having a steel reinforcement bar ("rebar") that has deteriorated. The repair mortar includes steel fiber reinforcement, obviating the need for additional, lapped rebar.

BACKGROUND

Corrosion (for example, chloride-induced corrosion from contact with chlorine-containing water) of steel reinforcement bars ("rebar") in concrete structures is a major source of concern for aging infrastructure. As a result of formation of expansive corrosion product, rebar corrosion causes an increase in volume of the rebar and internal stress in surrounding concrete. Concrete cracking and spalling will occur when the internal stress increases to a certain level. The concrete structure is weakened due to the decreased rebar cross-section and resultant reduction in load-carrying capability of the rebar as well as the lack of integrity of the overlying concrete. Further, the exposure of the corroded rebar due to the spalled concrete results in further, accelerated corrosion of that portion of the rebar and additional, unexposed, sections of rebar. In addition to the reduction of strength, the fire resistance of the structure is degraded.

Figure 1:
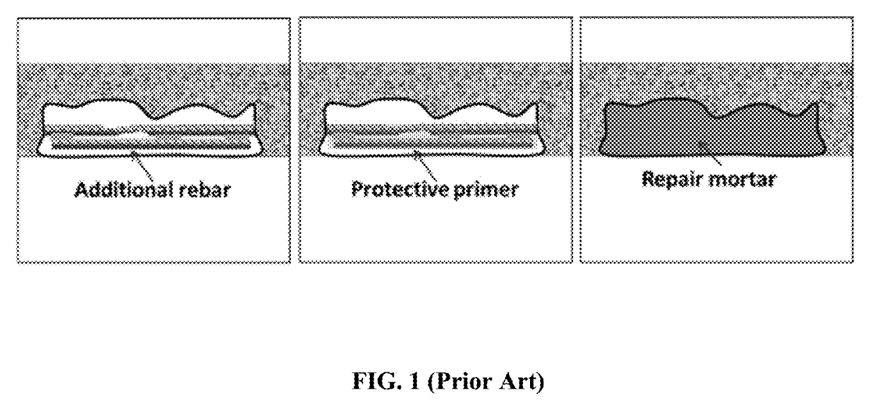
FIG. 1 is a depiction of a prior art repair structure including lapping rebar.

Due to the overall negative impact on a concrete structure, repair of spalled concrete and corroded rebar is necessary to ensure the integrity of reinforced concrete building works. However, reinforced concrete repair is both time consuming and costly due to the corrosion of the rebar. A procedure known as "lapping" is typically employed to repair reinforced concrete. An example of a section of concrete repaired by lapping is schematically depicted in FIG. 1 (prior art). In lapping repair for reinforced concrete, the damaged concrete must first be removed to expose and evaluate the corroded rebar, and a new section of uncorroded rebar is parallelly overlapped with the corroded section such that the new, uncorroded rebar re-strengthens that section of the original concrete structure. According to building codes (e.g., ACI 318), a section of uncorroded rebar must also be exposed to make enough lapping length, typically requiring removal of intact concrete. This removal of intact concrete increases the time and expense of the repair. The new rebar is laid alongside the existing rebar and may also be affixed to the existing rebar by tying or welding. Following the lapping, repair mortar is spread over the lapped and corroded rebar structure.

In addition to the lengthy repair time and expense, the addition of new rebar to the structure may cause galvanic corrosion. This is because there is a potential galvanic effect between steel that is in an active (corroding) state and steel that is in the passive (non-corroding) state. As a result, corrosion of the lapped structure may occur at an accelerated pace in the future, reducing the length of time between repair cycles. This is particularly true in regions of the reinforced concrete structure exposed to the harshest environments as is often the case in an area needing repeated repairs.

Thus, there is a need in the art for a concrete repair structure that can restore the strength to a region of damaged, reinforced concrete without the need for lapping rebar in the repair structure.

SUMMARY OF THE INVENTION

A repaired reinforced concrete structure is provided which includes one or more reinforcing steel bars of cross-sectional area $A_x$, the one or more reinforcing steel bars having one or more corroded sections of cross-sectional area $A_y$, wherein $A_y$ is greater than or equal to approximately $0.6\,A_x$.

A reinforced ordinary Portland cement-based repair mortar is positioned directly on the one or more corroded sections of the one or more reinforcing steel bars without the addition of a lapped reinforcing steel bar. The reinforced repair mortar includes at least approximately 1 percent by volume of reinforcing steel fibers such that the reinforced repair mortar restores a strength of a repaired region to greater than 100% of an original strength of a same region of concrete structure in an uncorroded state. The repair mortar repaired reinforced concrete structure is highly durable, as the repair mortar exhibits an air permeability resistance of greater than 1000 seconds.

DETAILED DESCRIPTION

Figure 2:
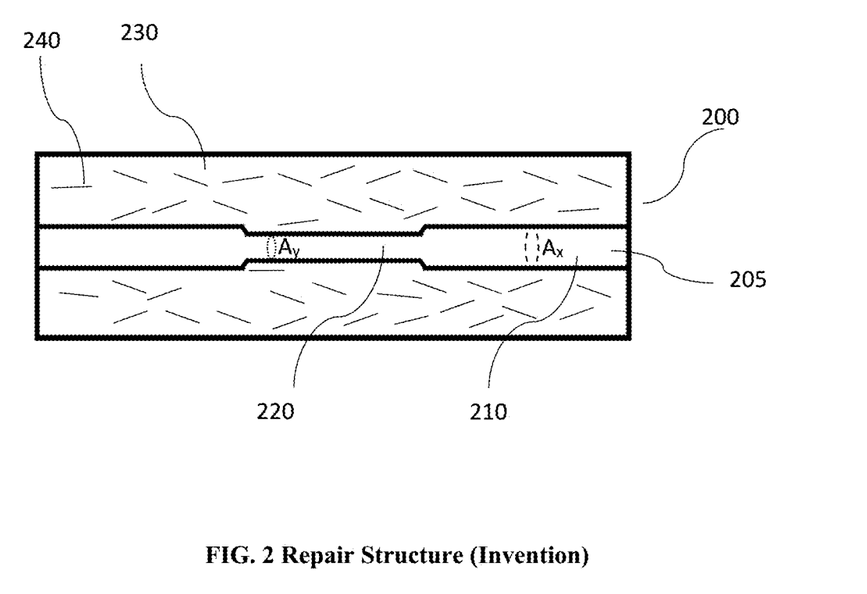
FIG. 2 schematically depicts a repair structure according to the present disclosure.

Turning now to the drawings in detail, FIG. 2 depicts a repair structure according to the present disclosure. In FIG. 2, a concrete structure 200 is provided having one or more reinforcing steel bars 205 (rebar) embedded in the concrete. Originally, rebar 205 has a cross-sectional area of $A_x$ as shown in region 210. However, due to corrosion, the rebar cross-sectional area is reduced to a cross-sectional area of $A_y$, where $A_y$ is approximately $0.6\,A_x$ or greater, as seen in region 220 of rebar 205. Typically, rebar that has corroded to a cross-sectional area of less than approximately $0.6\,A_x$ is replaced and is not suitable for use in the repair structures of the present disclosure.

Positioned over the corroded section 220 and non-corroded section 210 of rebar 205 is repair mortar 230. As will be discussed in further detail below, repair mortar 230 is an ordinary Portland cement based repair mortar that includes reinforcing steel fibers 240 of about 1-3 volume percent of the mortar. The steel fibers are included to enhance the performance of repair mortar. The repair mortar repaired concrete structure is highly durable and resistant to chemical attack, as demonstrated by the high resistance to air permeability of repair mortar. The repair mortar exhibits a resistance to air permeability of greater than approximately 1000 seconds. This compares to conventional repair mortars that have substantially lower air permeability resistance of less than approximately 250 seconds. Thus, a concrete with a high air permeability resistance will be durable, less prone to chemical attack. The repair structure 200 restores the strength of the concrete structure to at least approximately 100% of the original strength of the concrete structure.

The composition of the repair mortar used in the repair structures of the present disclosure includes approximately 35-45 wt. % ordinary Portland cement. Portland cement is a type of hydraulic cement that typically includes calcium oxides, silica, and alumina in various proportions. Compositions of Portland cement may include CaO in a range of 61-67%, $SiO_2$ in a range of 19-23%, $Al_2O_3$ in a range of 2.5-6%, $Fe_2O_3$ in a range of 0-6% and sulfate in a range of 1.5-4.5%. Various compositions of Portland cement are set forth in ASTM C150/C150M-16e1 "Standard Specification for Portland Cement", available from ASTM International, West Conshohocken, Pa., 2016, the disclosure of which is incorporated by reference herein. Any of these compositions may be used as the ordinary Portland cement in the repair structure of the present disclosure.

In order to control the setting time of the ordinary Portland cement and improve the ease of construction of repair mortar, gypsum, calcium sulfate dihydrate ($CaSO_4$ $2H_2O$), is included in the composition of the repair mortar in an amount from approximately 3 weight % to approximately 6 weight %. It is important to control the setting time so that there is a sufficient period to construct the repair. Further, it is important to control the workability for ease and rapidity of construction.

In order to create a high-strength repair mortar, silica fume is included in the repair mortar composition. Silica fume is typically fine amorphous silicon dioxide with a particle size on the order of several tens to several hundred nanometers. Silica fume acts as a filler and a Pozzolan in the repair mortar. Pozzolan is a material that, in the presence of water, can react chemically with calcium hydroxide to form a cementitious material. As a result of the filling effect and the chemical reaction, the resultant mortar has an increased strength. The amount of silica fume may be selected depending upon the desired strength of the repair mortar. The amount selected may range from approximately 0.5 to approximately 2 weight %. The amount of silica fume is also selected to increase the resistance to chemical attack, particularly by chloride ions.

For a repair mortar to be effective, it must be able to firmly bond to the rebar and concrete in the repaired area. Specifically, for the repair mortar of the present disclosure, firm bonding ensures effective stress transfer among concrete, rebar and mortar, and hence the loading capacity restoring. To this end, polymeric materials may be added to the repair mortar to enhance the cohesiveness of the repair mortar as well as the instantaneous and hardened bonding strength between the repair mortar and the original concrete structure. Polyvinyl alcohol (PVA) may be included in an amount from approximately 0.05 weight % to approximately 0.5 weight %, although the percentages may be varied to produce different cohesiveness and bonding strengths depending on the orientation of the repair structure and the depth of exposed concrete area. For example, vertical repair structures or overhead repair structures may need increased cohesiveness and bonding strength as compared with horizontal repair structures. Another polymer, ethylene vinyl acetate (EVA), may also be used to enhance the bonding strength of the repair mortar. EVA may be added in an amount from approximately 1 weight % to approximately 2.5 weight %. Note that, depending upon the repair orientation and the depth of exposed concrete area, other polymers may be used or the ratio of PVA to EVA may be varied. EVA may also be used to adjust the setting time of the concrete, lengthening the working time of repair mortar. The bonding strength between the repair mortar of the present disclosure and concrete substrate was measured to be approximately 1.5-3 MPa, between the repair mortar and 10 mm round rebar was measured to be above 4 MPa, both ensuring an effective stress transfer.

A superplasticizer in an amount from approximately 0.03 weight % to approximately 0.05 weight % may be included in the repair mortar composition. "Superplasticizer," as used herein, refers to materials used to disperse cement particles and eliminate cement agglomerates. Superplasticizers may be polymers such as polycarboxylate-based polymers, for example, polycarboxylate ether-based polymers.

Hydroxy propyl methyl cellulose (HPMC) or other cellulose ethers may be included in the repair mortar as thickeners that also improve the workability of the mortar. HPMC may be included in an amount of approximately 0.01 weight % to approximately 0.03 weight %.

Figure 3:
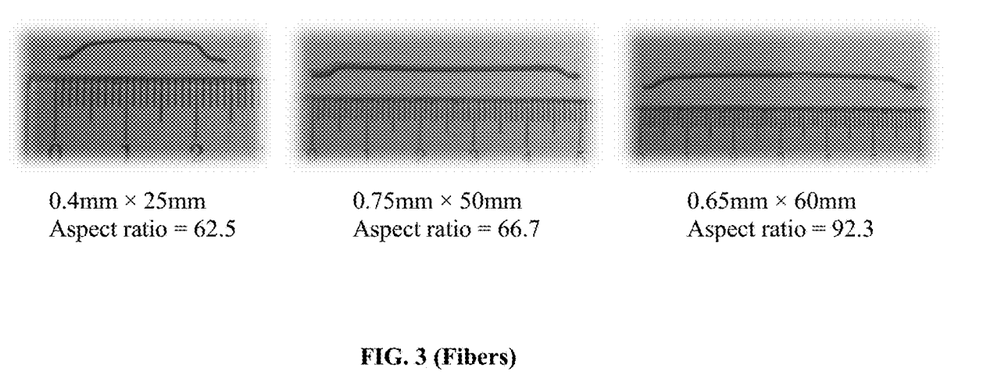
FIG. 3 is a photograph of three types of reinforcing steel fibers used in the repair mortar of the present disclosure.

Fiber additives play an important role in the mechanical properties and anti-cracking performance of the repair mortar of the present disclosure. Because cement has weak tensile properties, fiber reinforcement is used to enhance tensile strength. Fibers may also help prevent cracking during drying. Two types of fibers, steel fibers and polymeric fibers, may be employed in the repair mortars used in the novel repair structures. In contrast to the rebar of the concrete structure to be repaired, polymeric fiber additives are randomly-oriented within the mortar, but the steel fibers are mostly alongside the rebar. Steel fibers 240 may be used to increase the strength of the repair mortar and may be included in an amount from approximately 1% to approximately 3% by volume of the repair mortar. As will be discussed in further detail below, different sizes, aspect ratios and geometries of steel fibers may be selected depending upon the final repair application. Crimped steel fiber and straight steel fiber with and without end hooks were studied. Three sizes of stainless steel fibers with end hooks were also investigated in the working examples: 0.4 mm×25 mm (62.5 aspect ratio), 0.75 mm×50 mm (66.7 aspect ratio), and 0.65 mm×60 mm (92.3 aspect ratio). Examples of the three types of straight fibers with end hooks are depicted in FIG. 3. Steel fiber without surface coating, galvanized steel fiber and steel fiber with copper coating may be included in the repair mortar of the present disclosure.

Polymer fibers may also be added to the repair mortar. One type of polymer fiber that may be used is polypropylene fibers. Polymer fibers may help reduce shrinkage and cracking of the repaired structure and act as crack arresters as the fibers may prevent cracks from propagating by adhering parts of the concrete to each other. Further, because polypropylene fibers have a melting temperature less than 200° C., they can enhance the anti-spalling properties of concrete exposed to fire. Polymer fibers may be included in an amount from approximately 0.1 weight % to approximately 0.3 weight %. Other polymeric fibers that could be dispersed in cementitious materials may also be included in the repair mortar of the present disclosure.

Aggregate, the structural filler of the repair mortar, provides compressive strength and bulk to the repair mortar and may be chosen based on the desired durability, strength, and workability of the repair mortar. The repair mortar of the present disclosure may include sand and/or lightweight aggregate in varying amounts. A total amount of aggregate may range from approximately 45 weight % to approximately 60 weight %. Of this amount approximately 44 to 50 weight % may be sand and approximately 1-10 weight % may be lightweight aggregate. Lightweight aggregate is beneficial to the placement of repair mortar.

The disclosed repair mortar has a very high air permeability resistance. Air permeability is the measure of the flow of air into a concrete structure. Air permeability resistance provides an indication of concrete durability and concrete resistance to chemical attack, such as chemical attack from chlorine. Thus, a concrete with a high air permeability resistance will be durable, less prone to chemical attack and, consequently, will be less prone to rebar corrosion. The disclosed repair mortar has an air permeability resistance of at least approximately 1000 seconds.

The following examples and comparative examples describe specific formulations, method of making a repair mortar, methods of making a repair structure, mechanical tests of repair structures, and comparisons with commercially-available repair mortars.

EXAMPLES

Example 1: Repair Mortar Composition

Table 1 is an example of a specific mortar composition formed according to the ranges disclosed above. This specific mortar composition is employed in the methods of making, repair structures, and mechanical testing of the following working examples.

TABLE 1

Exemplary Composition of Repair Mortar

| Item | Components | Raw materials | Mix proportion (kg) |
|---|---|---|---|
| 1 | Binder | Ordinary Portland cement, Gypsum, Silica fume | 11.79 |
| 2 | Aggregate | Dry sand, Lightweight aggregate | 12.63 |
| 3 | Polymer | EVA, PVA | 0.53 |
| 4 | Admixture | Superplasticizer, HPMC | 0.02 |
| 5 | Fiber | Steel fiber, PP fiber | 2.04 |

The above composition containing 2 volume percent loading of 60 mm long stainless steel fibers (92.3 aspect ratio, with end hook) was tested and the results are shown in Table 2 below:

TABLE 2

Properties of the Repair Mortar of Table 1:

| Target Property of Repair Mortar | Example 1 Repair Mortar |
|---|---|
| a) Steel fibers content from 1~3%; | 2% |
| b) Aspect ratios (Ratio of length to diameter) from 20 to 100; | 60 mm long fibers used (Aspect ratio = 92.3) |
| c) Tensile strength (at 28 days) >3.5 MPa#; | 4.3 MPa |
| d) Optimal viscosity for filling of space around rebar. | Instant adhesion thickness not below 60 mm |

The performance of the repair mortar of Example 1 with the exception of the steel fibers was also tested, and the results are shown in Table 3 below, along with a comparison to a known, commercially-available repair mortar.

TABLE 3

Mortar Comparison

| Properties | Specification of repair mortar following relevant Hong Kong Code | Commercially-available repair mortar | Repair Mortar of Example 1 |
|---|---|---|---|
| Compressive strength (MPa) 28 days | 30-40 | 30 | 34.9 |
| Tensile strength (MPa)-7 days | ≥2 | 2.7 | 2.5 |
| Bond strength (MPa)-7 days | ≥1.5 | 2.2 | 2.6 |
| Air permeability resistance (s) 35 days | ≥150 | 216 | 1399 |

Example 2: Preparation of a Repair Mortar

1. Provide a 5 kg bag of dry powder including all of the ingredients of the repair mortar described in Example 1 with the exception of the stainless steel fibers.
2. Add 0.86 liter of water into a mixing bucket. Debag the pre-packaged repair mortar and pour the dry powder material into the bucket slowly.
3. Mix the powder-water mixture for 2.5 minutes with an electric mixer at a spinning speed of 50-99 rpm until a uniform paste repair mortar is obtained.
4. Place the repair mortar into a drum mixer. Add the steel fibers followed by mixing for approximately 3 minutes and 30 seconds. The drum mixer used has no self-motivated stirrer inside, that preventing distortion of steel fibers during mixing.

Example 3: Formation of a Repair Structure Using Repair Mortar of Example 1

Figure 4A:
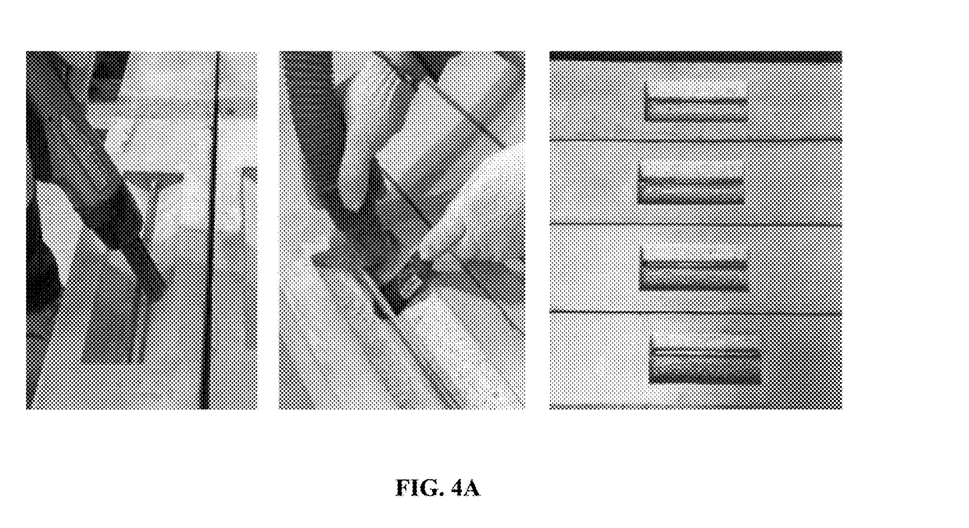
FIGS. 4A-4E depict the creation of a repair structure.
Figure 4B:
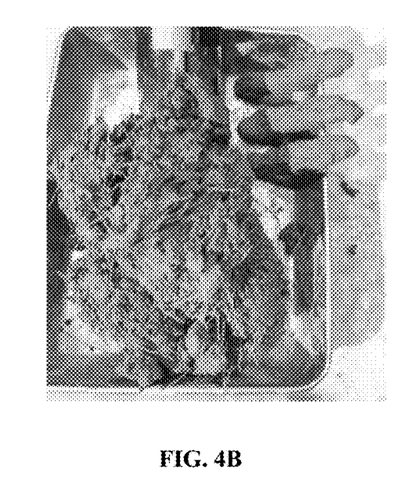

FIGS. 4A-4E depict the application of repair mortar to an area of exposed rebar. Application is according to the process set forth below:

1. (For actual repair) Remove spalled concrete from repair area to expose corroded rebar. Remove corroded portions of the rebar with a wire brush. Optionally apply a repair primer to the corroded region of rebar.
2. (For mechanical testing) Roughen the exposed concrete around rebar in trapezoid void, which simulates the repair area formed by removing spalled concrete in actual repair case, pre-formed in the bottom mid-span region of testing beam (FIG. 4A). Before making the testing beam, the central 100 mm length of 10 mm diameter rebar exposed in trapezoid void was narrowed to 60% of the original area of rebar. Section lengths for different tests are set forth in the various test results below.

Figure 4C:
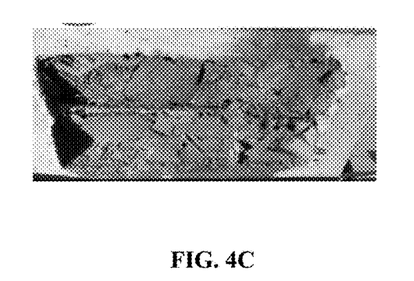
Figure 4D:
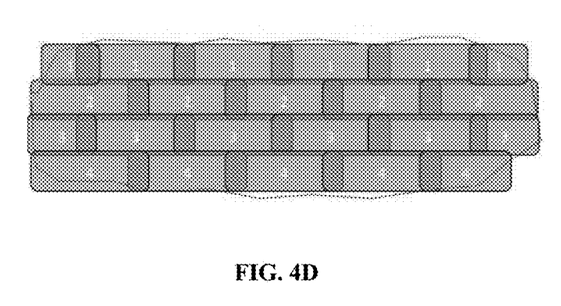
Figure 4E:
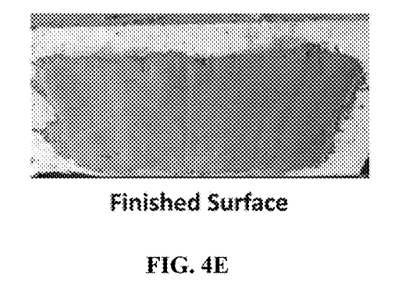

3. Form the composition Example 1 according to the procedure of Example 2. Create a number of repair mortar strips with similar size, e.g. 20 mm in diameter and 80 mm in length (FIG. 4B), so that it can be placed and squeezed on the exposed repair area by gloved hands or by a trowel, with the orientation of steel fibers in repair mortar alongside the direction of corroded (narrowed) rebar
4. During application, the well-mixed repair mortar strips are patched onto the substrate with trowel or gloved hands strip by strip and layer by layer to level up with the adjacent sound concrete and the required alignment. Make sure all gaps including those underneath the reinforcement are fully filled up with repair mortar without void.
5. The strips should be patched in a staggered arrangement along the rebar direction, from one end to another end (FIG. 4C, 4D). Intermediate strips/layers should be keyed and primed before the next strip/layer is applied.
6. Level up the surface of the repair mortar with trowel and/or spatula and to align with the adjacent surface. Finish the surface of the repair mortar to the required texture by trowel or other suitable tools (FIG. 4E).

The repair structures formed according to FIGS. 4A-4E were subjected to mechanical testing as set forth in the Examples below.

Example 4: Preparation of Repair Structure Samples for Mechanical Testing

Reinforced concrete beams of 1900 mm length were cast for four-point bending test and cyclic loading test. The reinforced concrete beams included 10 mm rebar reinforcements. The two ends of the embedded rebar were hooked to avoid bond slip. Trapezoid voids were pre-formed in the bottom mid-span region of testing beam, with the 10 mm rebar exposed in the void region. The length of the trapezoid voids for filling with repair mortar, Lv, were determined as 300 mm and 400 mm to further investigate effect of bond lengths between repair mortar and steel rebar. Central 100 mm regions of rebar were narrowed by grinding to 60% of the original cross-sectional area $A_x$ of 10 mm diameter rebar ($A_y=0.6\ A_x$) for different tests.

Figure 5A:
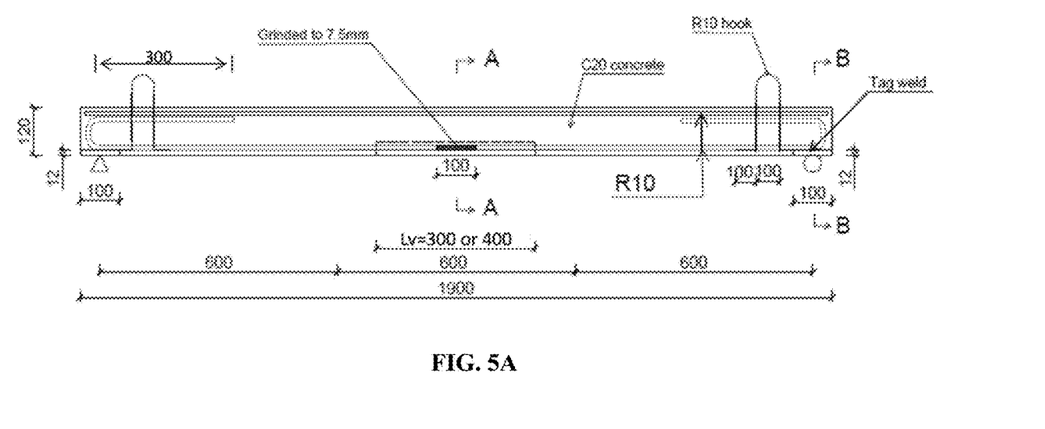
FIGS. 5A-5B show the test conditions and test specimens for mechanical testing.
Figure 5B:
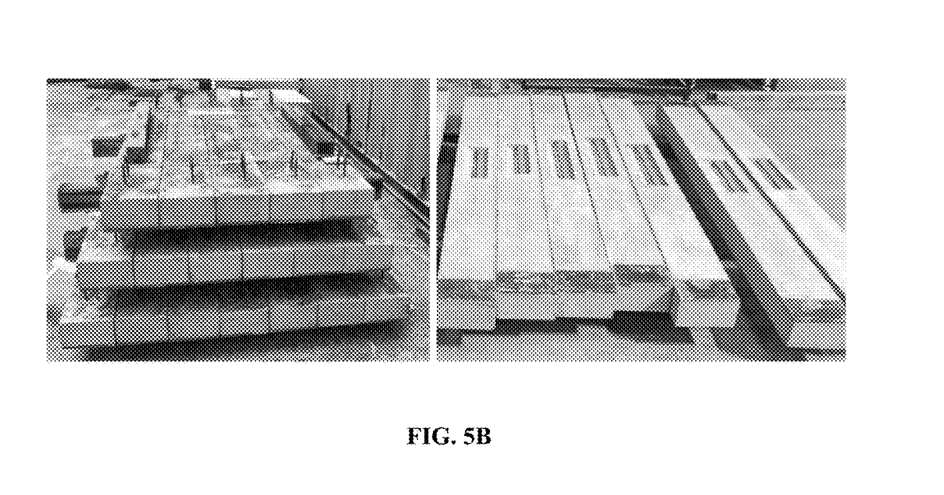

FIG. 5A depicts the specimen dimensions for four-point bending tests and cyclic loading tests. FIG. 5B shows photographs of the prepared specimens prior to testing.

Table 4 lists the samples for mechanical testing. Two sets of tests were performed for Example 1 repair mortar, with one set having bond coat (BC), commercially-available styrene-butadiene rubber (SBR) emulsion, applied on the concrete substrate before repair mortar applying, while the other set having no bond coat applied.

For the four-point bending test, the beam span is 1.8 m. Two point loads were applied at one-third and two-thirds of the beam span. The beam specimens were tested with displacement control mode at a rate of 0.01 mm/sec.

TABLE 4

Samples for Mechanical Testing

| | Beam Type | Bond Length | Mortar for Patch-up | No. of Beams |
|---|---|---|---|---|
| Four-point bending test | Control 1 | — | — | 1 |
| | Lv = 400 | 150 mm | Example 1 (w/o BC) | 2 |
| | | | Example 1 (w/BC) | 2 |

TABLE 4-continued

Samples for Mechanical Testing

| | Beam Type | Bond Length | Mortar for Patch-up | No. of Beams |
|---|---|---|---|---|
| | Lv = 300 | 100 mm | Example 1 (w/o BC) | 1 |
| | | | Example 1 (w/BC) | 2 |
| Cyclic loading test | Lv = 400 | 150 mm | Example 1 (w/o BC) | 2 |
| | | | Example 1 (w/BC) | 2 |
| | Lv = 300 | 100 mm | Example 1 (w/o BC) | 2 |
| | | | Example 1 (w/BC) | 2 |

Example 5: Results of Mechanical Tests: Four-Point Bending and Cyclic Loading Tests Since the bending moment capacity was reduced due to loss of steel area, the fiber reinforced repair mortars are used to restore the capacity of RC beams. Therefore, the percentage of recovery is defined as the ratio of bending moment capacity of the repaired beam to that of the beam with full steel area.

The disclosed repair mortar is targeted to restore corroded reinforced concrete elements in aged buildings which were built since 1970s. The steel reinforcing bars used in these aged buildings was generally grade R250, with yield strength of 250 MPa. However, R250 steel bars were rarely found in the present market stock. In view of this, HPB300 steel rebars have been used in the experiments and the yield strength was measured to be 374 MPa. Therefore, the percentage of recovery with respect to RC beams reinforced with steel bars with 250 MPa tensile strength can be calculated by $$\% \text{ of recovery} = \frac{M_f + M_{p,250,60\%}}{M_{p,250,100\%}} \quad (1)$$

in which, $M_f$ is moment capacity contributed by fiber reinforced repair mortar; $M_{p,250,100\%}$ is the calculated moment at yield with the rebar that has yield strength of 250 MPa and full area; $M_{p,250,60\%}$ is the calculated moment at yield with the rebar that has yield strength of 250 MPa and remains 60% of the area.

There are two methods of calculating $M_f$ in Equation (1), as described below.

The first method is to indirectly obtain the maximum stress of the reinforcing bar when the RC beam was loaded to its peak loading capacity. The control beam contained a full 10 mm diameter rebar, which was prepared in the first batch of casting. The maximum stress in the reinforcing bar corresponding to the peak load can be obtained by solving the following equations:

$$M_p = f_c bx\left(h_0 - \frac{x}{2}\right) \quad (2a)$$

$$f_p A_s = f_c bx \quad (2b)$$

in which
- b=Width of the beam cross-section;
- $h_0$=Effective height of the beam cross-section;
- x=Height of compressive zone;
- $A_s$=Area of the reinforcing bar;
- $f_p$=maximum stress in the reinforcing bar corresponding to the peak load.

With the predicted $f_p$, the moment capacity of a beam with 40% area reduction of steel bar reinforcement can be calculated with equations (2a) and (2b). As the moment capacity of each specimen was the combined effect (tension side) of the reduced-area steel reinforcing bar and the repair mortar, the repair mortar's contribution to resist flexural loading can be directly subtracted from the moment capacity of each specimen as follows:

$$M_f = M_p - M_{p,f_p,60\%} \quad (3)$$

in which, $M_p$ is the measured moment corresponding to the peak load; $M_{p,\,374,60\%}$ is the calculated moment at yield with the rebar that has yield strength of 374 MPa (calculated value from control beam) and 60% of the area remaining; $M_f$ is the contribution of fiber reinforced repair mortar.

The second method is to directly use the measured moment capacity of the control beam which embedded a pre-grinded rebar to simulate 40% area reduction. The beams were fabricated in the second batch. The equation of calculating the bending moment resistance contributed by fiber reinforced repair mortar is expressed as:

$$M_f = M_p M_{p,control,60\%}$$

The percentage of recovery of the repaired structure was calculated using methods 1 and 2 above. Table 5 lists the applied forces and the calculated percent recovery.

TABLE 5

Percent Recovery for Four-Point Bending Test

| | $F_p$ (KN) | $M_p$ (KNm) | % of Recovery (by Method 1) | % of Recovery (by Method 2) |
|---|---|---|---|---|
| Control 1 | 8.18 | 2.45 | — | — |
| Example 1-150-1 (w/o BC) | 10.37 | 3.111 | 102.7 | 93.6 |
| Example 1-150-2 (w/o BC) | 11.84 | 3.552 | 125 | 115.9 |
| Example 1-150-1 (w/BC) | 13.72 | 4.116 | 153.1 | 144.4 |
| Example 1-150-2 (w/BC) | 13.6 | 4.08 | 151.3 | 142.6 |
| Example 1-100-1 (w/o BC) | 9.63 | 2.889 | 91.5 | 82.4 |
| Example 1-100-1 (w/BC) | 13.19 | 3.957 | 145.1 | 136.4 |
| Example 1-100-2 (w/BC) | 13.05 | 3.915 | 143.0 | 134.2 |

Figure 6A:
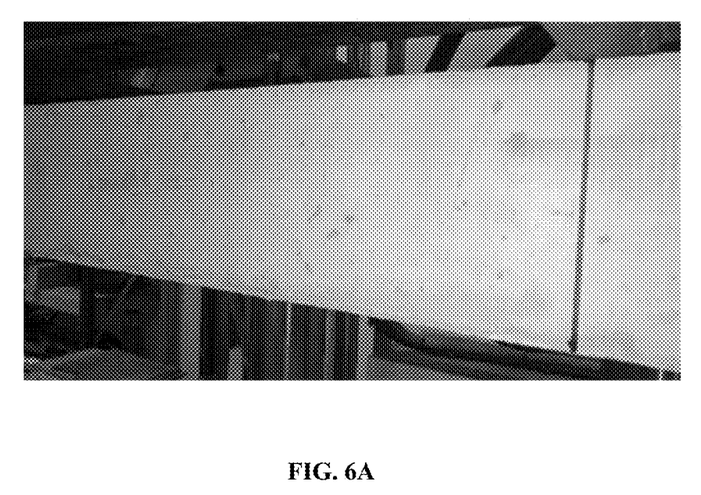
FIGS. 6A-6B show test specimens following cyclic testing.
Figure 6B:
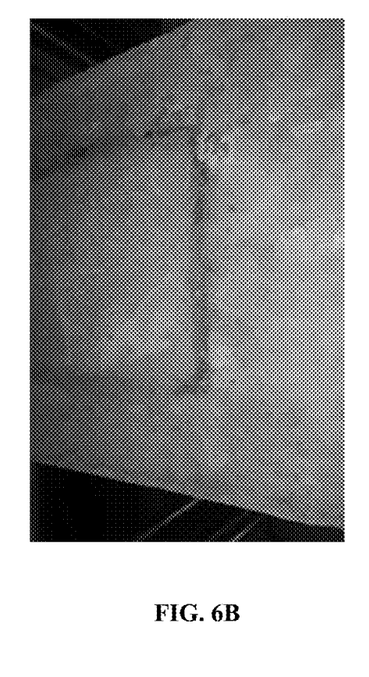

FIGS. 6A-6B depict side and bottom faces of a concrete slab subjected to cyclic loading tests. After 110,000 cycles, the slab remained intact. No visual crack or debonding was observed.

Example 6: Fire Testing

Figure 7:
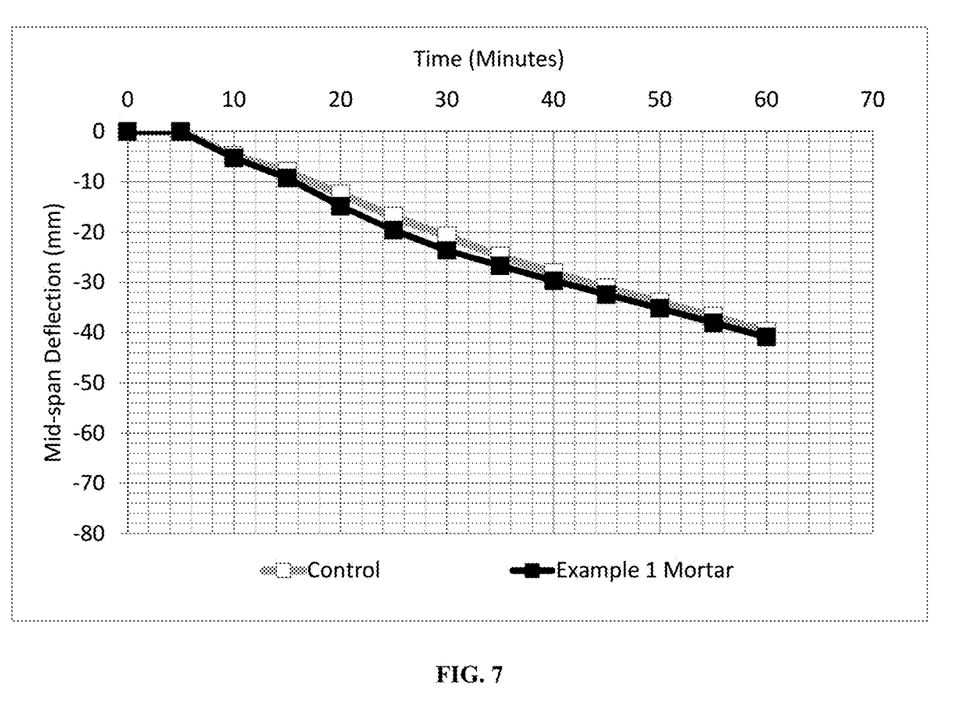
FIG. 7 shows the deflection curve of test specimens during fire testing.
Figure 8A:
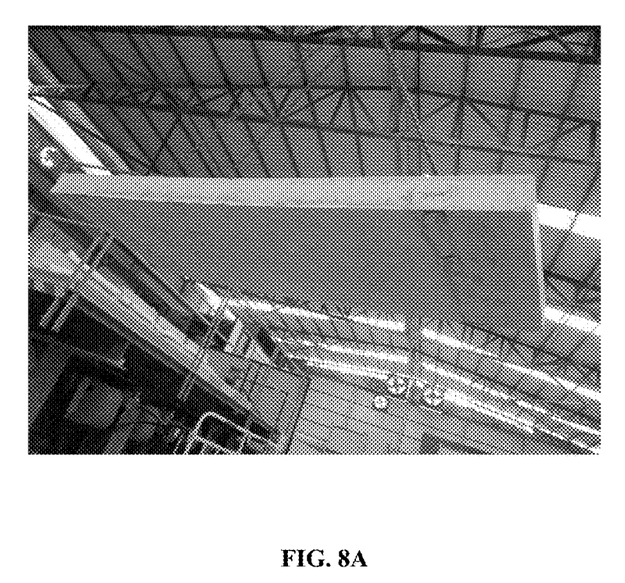
FIGS. 8A-8B are photographs of test specimens following fire testing.
Figure 8B:
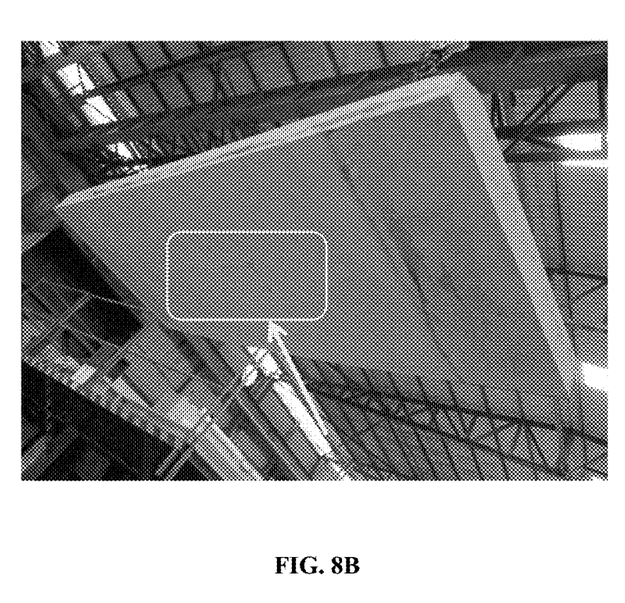

The fire test was conducted following BS EN 1363-1 & 1365-2. Fire test slabs specimens were loaded with weights equivalent to 5 kPa. After exposed to fire for 1 hour, the deflection of two (control and Example 1 mortar) specimens was within the deflection limit and deflection rate limit, specified in the fire test standard. All passed the fire test. FIG. 7 depicts a plot of the fire test deflection for the two specimens. FIGS. 8A-8B depict the two specimens following fire testing.

Example 7: Corrosion Testing

Figure 9A:
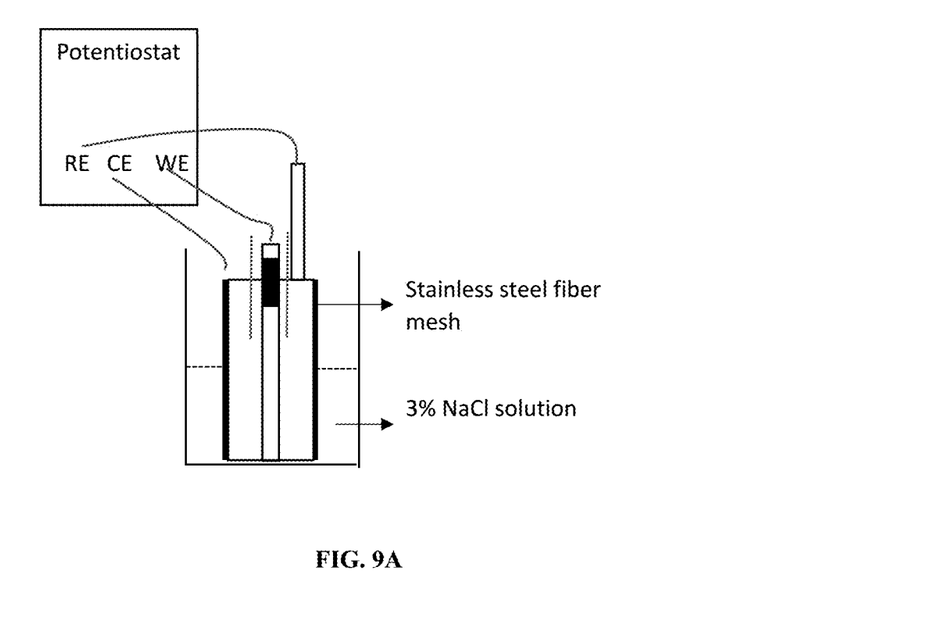
FIGS. 9A-9B schematically depict measurement setups of galvanic corrosion.

In the first measurement, self-corrosion was measured ($i_{corr}$ microcell current) with the microcell shown in FIG. 9A. The microcell uses a three-electrode system with a potentiostat in which RE is the reference electrode, CE is the counter electrode, and WE is the work electrode.

Figure 9B:
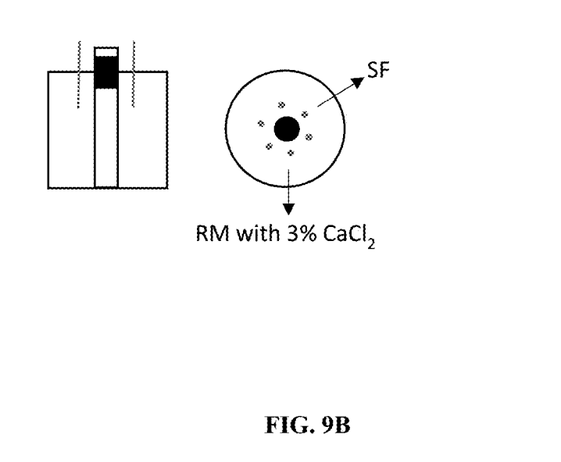

In the second measurement, galvanic coupling current is measured, $i_g$ (macro current). A voltmeter is used with an external resistor of 10000 Ohm to indirectly test the galvanic coupling current between steel fibers and corroded rebar where SF is steel fiber and RM is repair mortar in FIG. 9B. For comparison, the $i_g/i_{corr}$ of the Example 1 repair mortar system and the existing repair system (welding new rebar) were measured. The $i_g/i_{co}$n value between steel fiber (SF) in repair mortar and existing corroded rebar in old concrete was measured to be only about 3.6%, as a result of the large area ratio of anode (corroded rebar) and cathode (SF). However, the $i_g/i_{corr}$ value between welded new rebar and existing corroded rebar was measured to be over 30% in the prior art repair system.

According to above results, compared with the welded new rebar in existing repair method, the steel fiber in example 1 repair mortar does not alter the corrosion behavior of the corroded rebar in old concrete. This is in contrast to the prior art repair system in which corrosion is accelerated by the presence of the new, lapped rebar.

Example 8: Bonding Strength Measurement

The bonding strength between Example 1 repair mortar and 10 mm rebar of Example 3 was measured following Annex D of BS EN 10080. The bonding length between rebar and repair mortar is 100 mm. The bonding strength was measured to be above 4 MPa.

The bonding strength between Example 1 repair mortar and old concrete was measured by conducting a three points bending test. The specimen used is 75 mm×75 mm×300 mm prism. In order to prepare prism specimens, 75 mm×75 mm×150 mm concrete prism was prepared followed with 28 days curing; one 75 mm×75 mm face of concrete prism was then roughened, and the concrete prism was placed into mould of 75 mm×75 mm×300 mm; after applying bond coat to the roughened concrete face, the mould was fulfilled with Example 1 mortar following procedures described in Example 3, with the repair mortar contacting with the roughened concrete face. Three points bending tests were conducted after 28 days curing, and the measured bonding strength values are in a range of 1.5-3 MPa.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the specification, and following claims.

The invention claimed is:

1. A repaired reinforced concrete structure comprising:
one or more reinforcing steel bars of cross-sectional area $A_x$, the one or more reinforcing steel bars having one or more corroded sections of cross-sectional area $A_y$, wherein $A_y$ is greater than or equal to approximately 0.6 $A_x$;
a reinforced ordinary Portland cement-based repair mortar positioned directly on the one or more corroded sections of the one or more reinforcing steel bars without the addition of a lapped reinforcing steel bar, the reinforced repair mortar including at least approximately 1 percent by volume of reinforcing steel fibers, one or more polymers in a total polymer amount of approximately 1 weight % to approximately 3 weight percent, and a superplasticizer in an amount from approximately 0.03 weight % to approximately 0.05 weight % such that the reinforced repair mortar restores a strength of a repaired region to greater than or equal to approximately 100% of an original strength of a same region of concrete structure in an uncorroded state and wherein the reinforced ordinary Portland cement-based repair mortar exhibits an air permeability resistance of greater than 1000 seconds and wherein reinforced concrete structure does not accelerate the corrosion of the one or more reinforcing steel bars.

2. The repaired reinforced concrete structure as recited in claim 1, wherein the volume of reinforcing steel fibers is 1 volume percent to 3 volume percent.

3. The repaired reinforced concrete structure as recited in claim 1, wherein the repair mortar includes gypsum in an amount of approximately 3 weight % to approximately 6 weight percent.

4. The repaired reinforced concrete structure as recited in claim 1, wherein the one or more polymers are selected from one or more of polyvinyl alcohol or ethylene vinyl acetate.

5. The repaired reinforced concrete structure as recited in claim 1, wherein the repair mortar includes aggregate in an amount of 45 weight % to approximately 60 weight %.

6. The repaired reinforced concrete structure as recited in claim 5, wherein the aggregate is selected from one or more of sand and lightweight aggregate.

7. The repaired reinforced concrete structure as recited in claim 1, wherein the repair mortar includes polymer fiber.

8. The repaired reinforced concrete structure as recited in claim 7, wherein the polymer fiber is polypropylene in an amount of approximately 0.1 weight % to approximately 0.3 weight %.

9. The repaired reinforced concrete structure as recited in claim 1, wherein the repair mortar includes silica fume in an amount from approximately 0.5 to approximately 2 weight %.

10. The repaired reinforced concrete structure as recited in claim 1, wherein a bonding strength between the one or more reinforcing steel bars and the repair mortar is approximately 4 MPa or greater.

* * * * *